Jan. 4, 1966 C. G. FRAIDENBURGH ET AL 3,227,441

DOCUMENT HANDLING APPARATUS

Filed Aug. 1, 1962 9 Sheets-Sheet 1

INVENTORS
CARL G. FRAIDENBURGH &
THEODORE J. MISBIN
BY John V. Regan
Attorney

DOCUMENT HANDLING APPARATUS

Filed Aug. 1, 1962 9 Sheets-Sheet 2

INVENTORS
CARL G. FRAIDENBURGH &
THEODORE J. MISBIN
BY John V. Regan
Attorney

INVENTORS
CARL G. FRAIDENBURGH &
THEODORE J. MISBIN

BY John V. Regan
Attorney

INVENTORS
CARL G. FRAIDENBURGH &
THEODORE J. MISBIN
BY John V. Regan
Attorney

DOCUMENT HANDLING APPARATUS

Filed Aug. 1, 1962 9 Sheets-Sheet 5

INVENTORS
CARL G. FRAIDENBURGH &
THEODORE J. MISBIN
BY John V. Regan
Attorney

Jan. 4, 1966 C. G. FRAIDENBURGH ETAL 3,227,441

DOCUMENT HANDLING APPARATUS

Filed Aug. 1, 1962 9 Sheets-Sheet 6

INVENTORS
CARL G. FRAIDENBURGH &
THEODORE J. MISBIN
BY John V. Regan
Attorney

INVENTORS
CARL G. FRAIDENBURGH &
THEODORE J. MISBIN
BY John V. Regan
Attorney

INVENTORS
CARL G. FRAIDENBURGH &
THEODORE J. MISBIN

BY John V. Regan
ATTORNEY

INVENTORS
CARL G. FRAIDENBURGH &
THEODORE J. MISBIN
BY John V. Regan
ATTORNEY 3,227,441
DOCUMENT HANDLING APPARATUS
Carl G. Fraidenburgh, Cherry Hill Township, Camden County, and Theodore J. Misbin, Cherry Hill, N.J., assignors to Radio Corporation of America, a corporation of Delaware
Filed Aug. 1, 1962, Ser. No. 214,061
5 Claims. (Cl. 271—5)

This invention relates generally to document handling apparatus.

Most known document transport systems are designed to handle documents of only one type and size, including thickness. This is a disadvantage in that a separate document transport must be provided for each of the different type or size documents which are employed in many modern-day business systems. Moreover, separate document stackers, reading or sensing equipment, and the like generally must be provided for each transport system employed in the business complex. The result is high cost and high space requirements.

Some prior art systems have provision for handling documents of more than one size. These latter systems may be divided generally into two classes. In the first class, documents of different size are transported at different linear speeds. This is undesirable inasmuch as the cooperating equipment, a document reader for example, generally operates at a fixed speed. Furthermore, the mechanical mechanism required to provide the different linear speeds of transport is usually complex.

In the second class, all documents are transported at the same linear speed, but the document rate is the same for all documents, regardless of size. This is undesirable and inefficient for the reason that maximum use is not made of the equipment when smaller documents are being transported. For example, if the reader operates full time when eight-inch long documents are being transported, it then operates only half time when four-inch documents are being transported, since the number of documents transported per unit time is the same in both cases.

Accordingly, it is a primary object of the present invention to provide apparatus which can transport documents of various sizes at the same linear speed, but at a rate which depends upon the document size.

It is another object of the invention to provide a document transport having the capability immediately aforementioned, and in which the moving mechanical transport members operate at a fixed speed, regardless of document size.

It is a further object of this invention to provide apparatus of the type described in which the moving mechanical transport members rotate rather than reciprocate, whereby the operating speed is increased and objectionable vibration is decreased.

Once the transported documents are read, it often is desirable to separate certain ones of the documents from the others. For example, some of the documents may contain erroneous information or the information may not be readable, and it is desirable to distinguish these documents from the others. On the other hand, it may be desired to extract or pick out from the stack those documents which contain a particular class of information. It is customary in prior art machines to provide two output hoppers for this purpose. Documents containing erroneous information, or the preselected class of information, as the case may be, are fed to one output hopper, and the remaining documents are fed to the other output hopper. The use of two hoppers instead of one results in an increase in cost and space requirements.

Accordingly, it is one object of this invention to provide a document transport system which need have only one output hopper.

It is another object of this invention to provide a document transport system having only one output hopper in which certain selected documents may be offset from the other documents.

It is still another object of this invention to provide a novel gate means for selectively offsetting certain documents from the stack of documents in an output hopper.

A document transport embodying the invention includes a vacuum feed drum which is positioned opposite the leading edge of the first document in an input hopper, and which is rotatable at a constant speed in the direction of transport of the documents. Documents picked up by the feed drum are fed to a vacuum stacker drum, which is rotated in synchronism with the feed drum and which transports the documents to an output, or stacker, hopper. One or more reading stations may be positioned along the transport path for reading information contained in the documents. A rotating separator wheel, located at the throat of the input hopper, prevents more than one document from being fed out of the input hopper at the same time.

Located within the feed drum is a fixed vacuum chamber. Associated with the chamber is an airtight valve shoe which is loaded against the inner surface of the drum opposite the leading edge of the first document in the input hopper. The feed drum is provided with one or more circumferential bands of spaced apertures, or slots, and a number of shoes having apertures which mate with the drum apertures to apply a vacuum to the first document. These apertured shoes may be individually removable, in one embodiment of the invention, and are replaceable with solid shoes, whereby the number of documents fed out of the input hopper per drum revolution is controllable in accordance with the size of the documents to be transported. Thus, all documents are transported at the same linear speed, but the rate of document feed is adjustable according to the document size. In another embodiment of the invention the apertured shoes are slidably mounted on the drum, whereby these shoes may be individually positioned so that they either block the drum apertures or so that the apertures in the shoes mate with the apertures in the drum.

The output gate means comprises a pivotally mounted member located adjacent to the entrance of the output hopper, and having one or more fingers, each preferably having a step-shaped free end. The stacker drum has a number of grooves, each groove being of sufficient depth to receive the entire free end of a different finger. The gate member is movable between a first position in which the entire free ends of the fingers fit in the drum grooves, and a second position in which only a portion of the free end of each finger projects into its associated drum groove. In the first position, the document is stripped off the drum by the fingers and is guided along the sides thereof against one wall of the output hopper. In the second position, the free ends of the fingers block the path of the document and prevent its being fed against the wall of the output hopper. Such a document is offset from those documents which are stacked against the hopper wall.

In the accompanying drawing, like reference characters refer to like components, and:

Figures 9, 10:
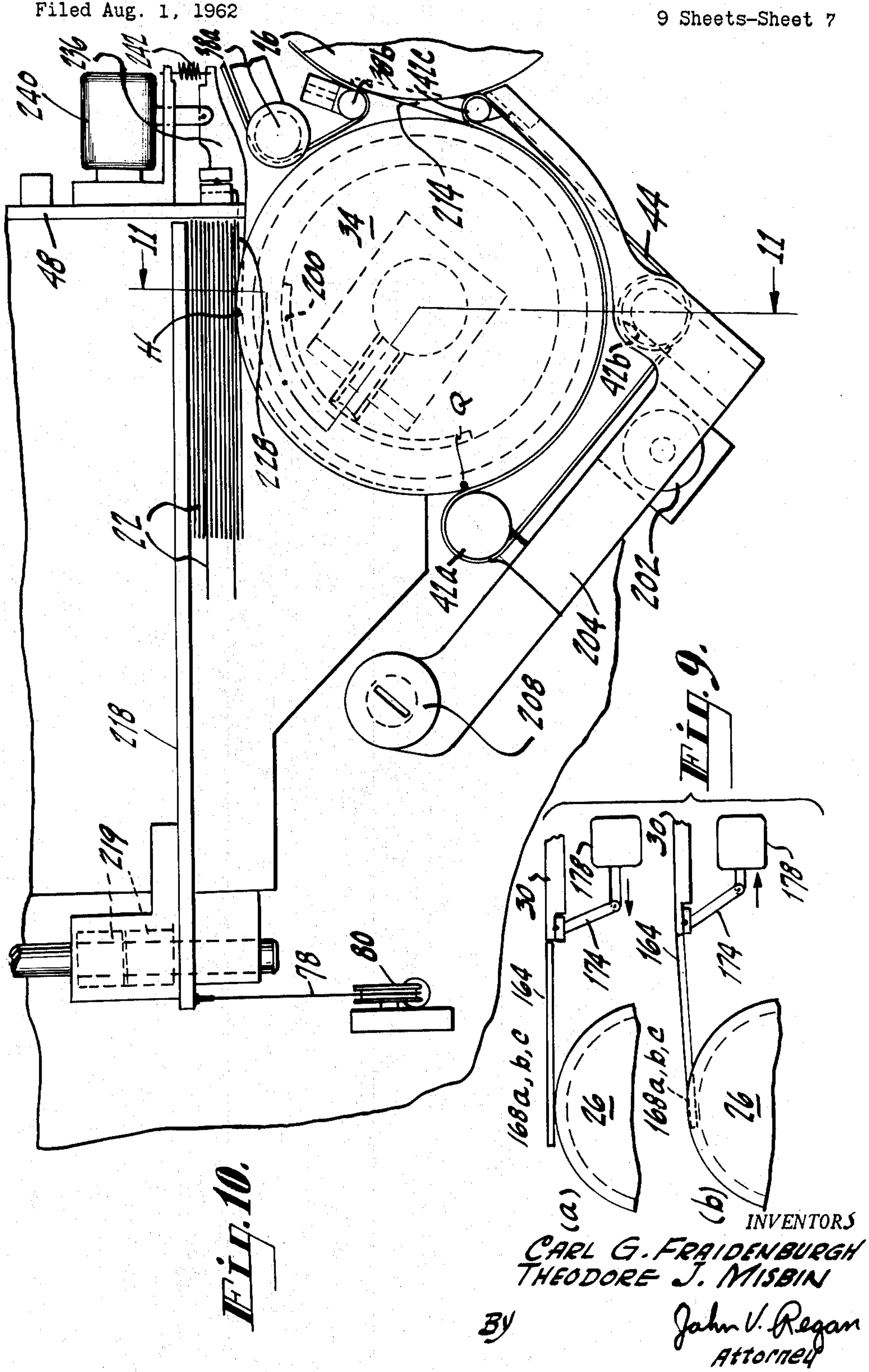
Figures 11, 12:
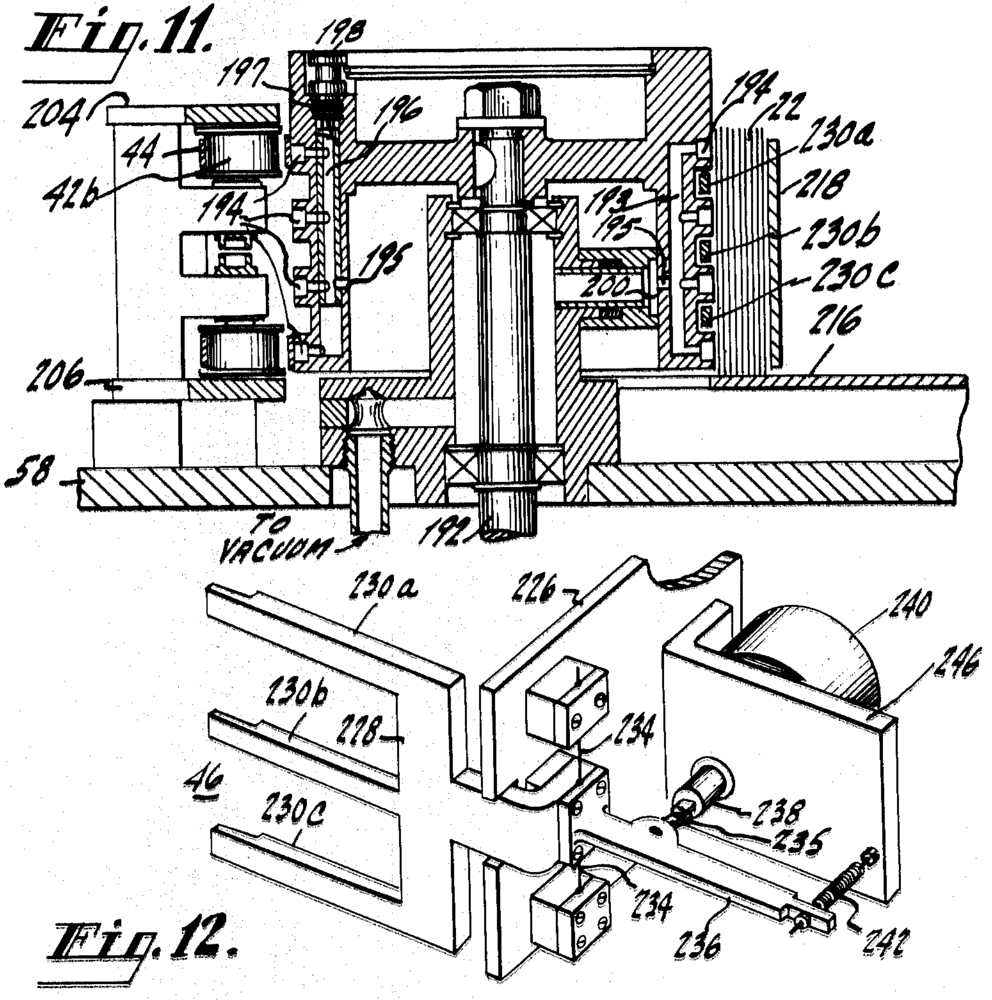
Figure 13:
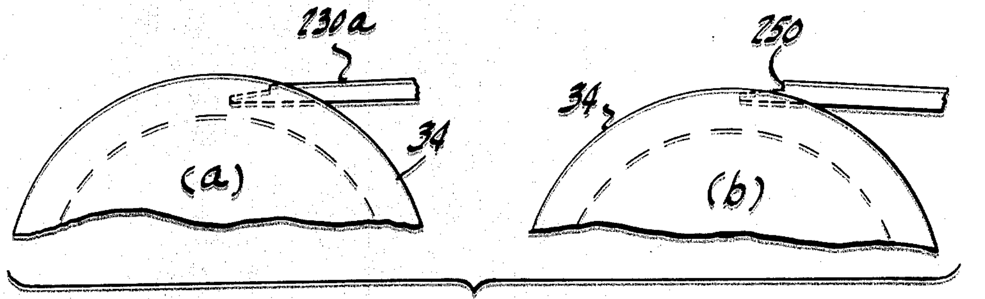
Figures 14, 15:
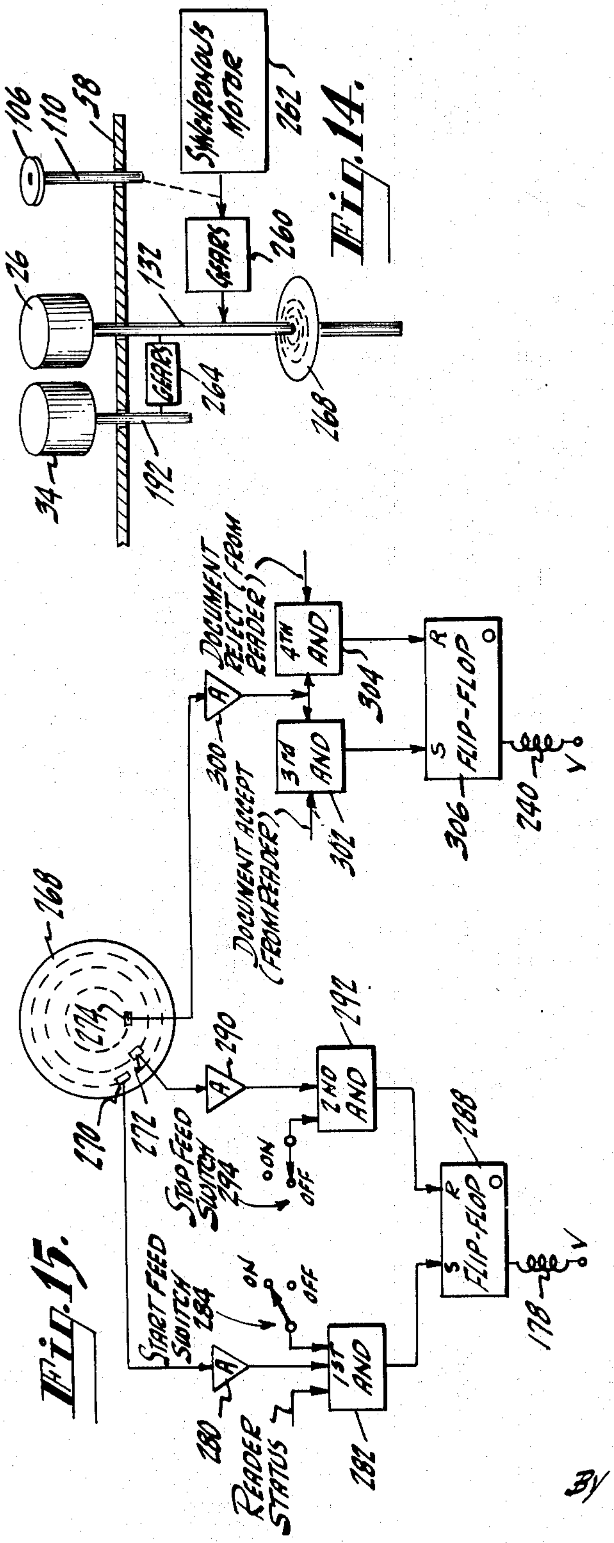

FIGURES 9(*a*) and 9(*b*) are partial plan views of the input control gate in the "inhibit" and "feed" positions, respectively;

FIGURE 10 is a fragmentary plan view of the stacker assembly;

FIGURE 11 is a cross-sectional view of the stacker assembly taken along the lines 11—11 of FIGURE 10;

FIGURE 12 is a perspective view of the output gate;

FIGURES 13(*a*) and 13(*b*) are views showing the positions of the output gate fingers, relative to the stacker drum, in the "accept" and "reject" positions, respectively;

FIGURE 14 is a diagram of the mechanical drive for the transport;

FIGURE 15 is a block diagram of the basic electrical control system; and

Figure 17:
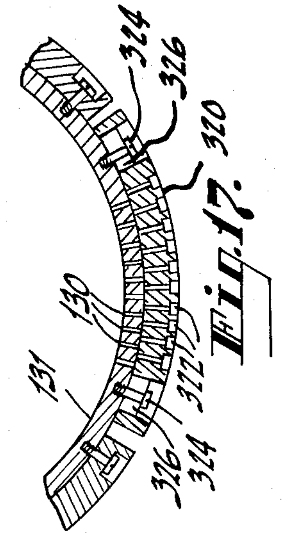
Figure 16:
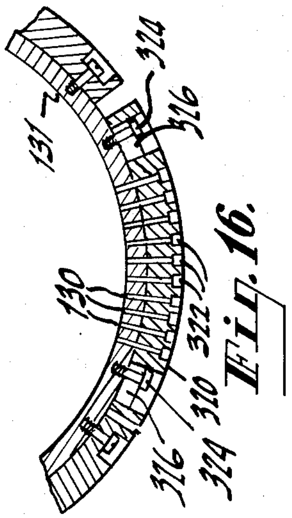

FIGURES 16 and 17 are two views of another feeder drum shoe arrangement according to the invention.

THE OVERALL SYSTEM

Figure 1:
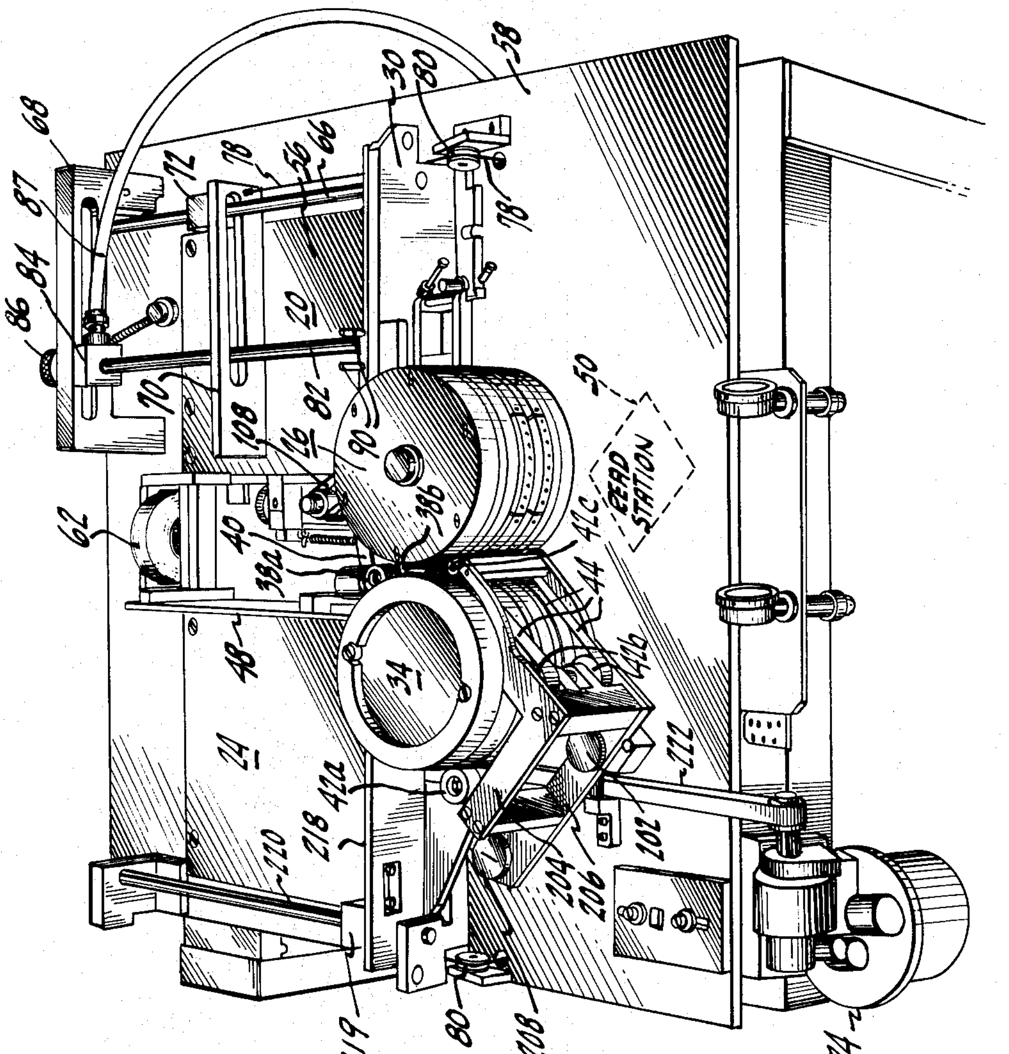
FIGURES 1 and 2 are perspective and plan views, respectively, of the overall document transport system.
Figure 2:
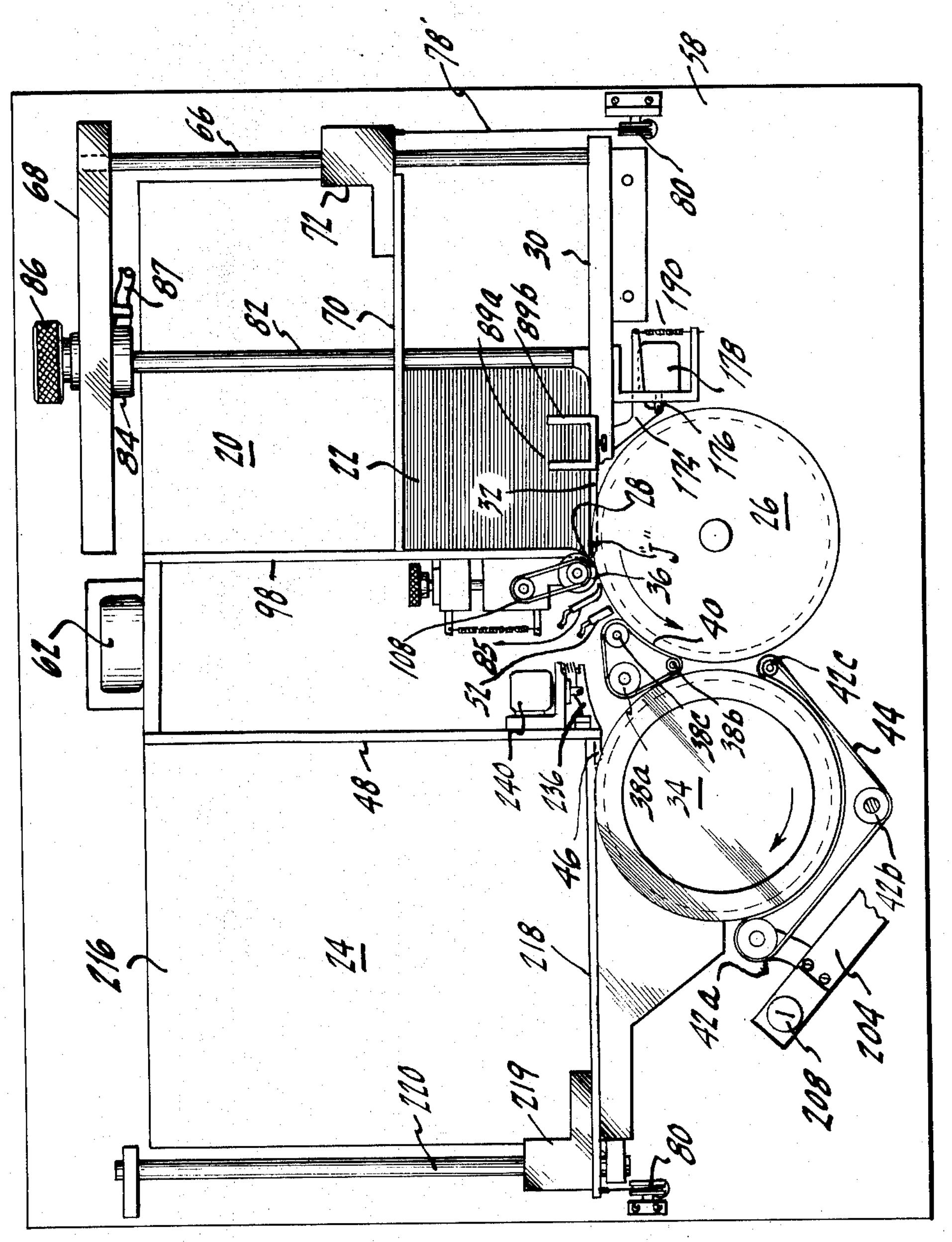

The overall document transport system may be seen best in the perspective view of FIGURE 1 and the plan view of FIGURE 2. These views are included to show the physical relationship of the various component parts to be described in detail hereinafter and, hence, only a brief description need be given of these figures.

The system includes an input hopper 20 for storing a stack of documents 22 to be transported, and an output, or stacker, hopper 24 for receiving the transported documents. A vacuum feed drum 26 is positioned opposite the throat 28 of the input hopper 20. Located at the forward end of the input hopper 20 adjacent the throat 28, and forming a part of the forward wall 30 of the hopper 20, is a pivotally mounted input gate member 32 which controls the position of the first document relative to the feed drum 26. In the "inhibit" position of the gate 32, the gate 32 holds the first document away from the feed drum 26 and prevents the feeding of documents out of the hopper 20. In the "feed" position of the input gate 32, the gate is pivoted to allow the leading edge of the first, or forward-most, document to be engaged by the feed drum 26. Feed drum 26 moves the first document out of the input hopper 20 under vacuum and carries the document to a vacuum stacker drum 34. A pair of separator wheels 36, located adjacent the throat 28, prevents more than one document from being fed out of the input hopper 20 at the same time.

A first set of three pairs of idler rollers 38*a*, 38*b* and 38*c* carries a pair of high friction, flat belts 40 which are driven by the feed drum 26 and which retain the document against the feed drum 26 as the document is transported toward the stacker drum 34. A second set of three pairs of idler rollers 42*a*, 42*b* and 42*c* carries a pair of high friction, flat belts 44 which are driven by the stacker drum 34. These belts 44 retain the document against the stacker drum 34. Positioned at the entrance of the stacker hopper 24, at the forward, right-hand corner thereof (FIGURE 2), is an output gate 46 which strips the documents off the stacker drum 34 and guides the documents either against the right-hand wall 48, or to a position off-set from the wall 48, depending upon the status of the gate 46.

During transport of the documents, the documents may move past one or more reader units. For example, a character reader 50, indicated schematically by the dotted outline, for reading a line of printed characters, may be positioned at a read station adjacent the stacker drum 34 to read a line of characters as the document passes the area between idler rollers 42*b* and 42*c*. On the other hand, the documents may be punched cards. In the embodiment shown, it is not possible to read an entire punched card if the punched card reader is located between idler rollers 42*b* and 42*c* because the belts 44 would cover a portion of the punched information. A punched card reader 52, however, may be located between the separator wheels 36 and the idler rollers 38*c*, where there is no belt to block the punched holes on the card. Inasmuch as the reader units, per se, form no part of the present invention, these units are shown symbolically in the drawing.

It should be noted that the transport system of the present invention, in contrast to known transport system, is adapted not only to handle documents of various sizes, in a manner to be described, but it is also capable of transporting documents of different types, for example punched cards, printed documents, etc., which documents may be read as the documents are transported from the input hopper 20 to the output hopper 24.

INPUT HOPPER

Figures 3, 8:
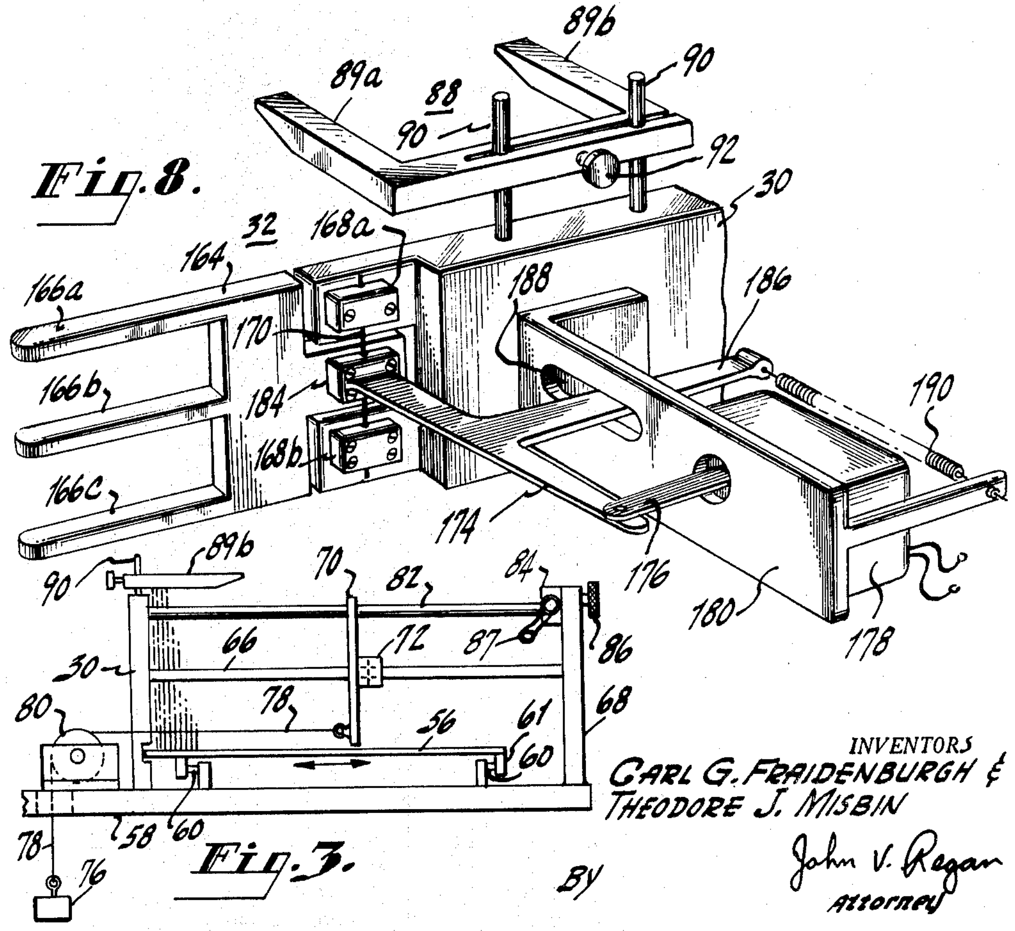
FIGURE 3 is a right side view of the input hopper assembly.
FIGURE 8 is a view of the input gate and vertical guide.

The input hopper (FIGURES 1, 2, 3 and 4) has a base plate 56 which is elevated above a common base plate 58, or table, and mounted thereon by means of elastic shock mounts 60 (FIGURE 3). Mounted on the common base 58, against a block 61 connecting the back ends of the input and output hopper base plates 58, 216, is an electromagnet 62 which is supplied, by means not shown, with sixty cycle, half-wave, rectified signals. Electromagnet 62 forces the hopper base plates 56 and 216 to vibrate through a small amplitude to reduce the frictional drag between the documents 22 and the base plates 56 and 216.

The front wall 30 of input hopper 20 is mounted on the common base plate 58 and extends to the vicinity of the feeder drum 26. (See FIGURE 4.) Fixedly attached at the back side of the front wall 30 is a guide rod 66, which is also fixedly attached to a rear support 68. A document loader plate 70 is constrained to move parallel to the front wall 30 by means of a linear bearing 72 attached to the loader plate 70 and fitted on the rod 66. Loader plate 70 is biased toward front wall 30 by means of a weight 76 (FIGURE 3) located beneath the common base 58. A wire 78, or string, is connected between the weight 76 and loader plate 70, and is guided by a pulley 80. Documents 22 are loaded in the input hopper 20 between the front wall 30 and the loader plate 70, and may be inserted while documents are being fed out of the hopper 20.

Front wall 30 has a horizontal slot or channel on the rear side thereof. A matching horizontal slot extends through the rear support 68. A hollow guide bar 82 rides in the horizontal channels aforementioned. At the back end of hollow guide bar 82, against the inside wall of the rear support 68, is a block 84 through which the guide bar 82 extends. This block 84 is rigidly attached to the guide bar 82 and, when it is held firmly against the rear support 68, it prevents the guide bar 82 from swinging and assuming a position other than perpendicular to front wall 30 and rear support 68. Guide bar 82 may be moved to the left or right, as viewed in the drawing, and is positioned, as shown in FIGURE 2, against the right side of the stack of documents 22. Essentially, guide bar 82 serves as an adjustable right side wall for the hopper 20, whereby documents of various length may be handled. Of course, only documents of the same length are loaded in the hopper 20 at one time. Guide bar 82 is held rigidly in place by tightening the adjustable knob 86, on the back side of rear support 68, to clamp block 84 firmly against rear support 68.

Figure 4:
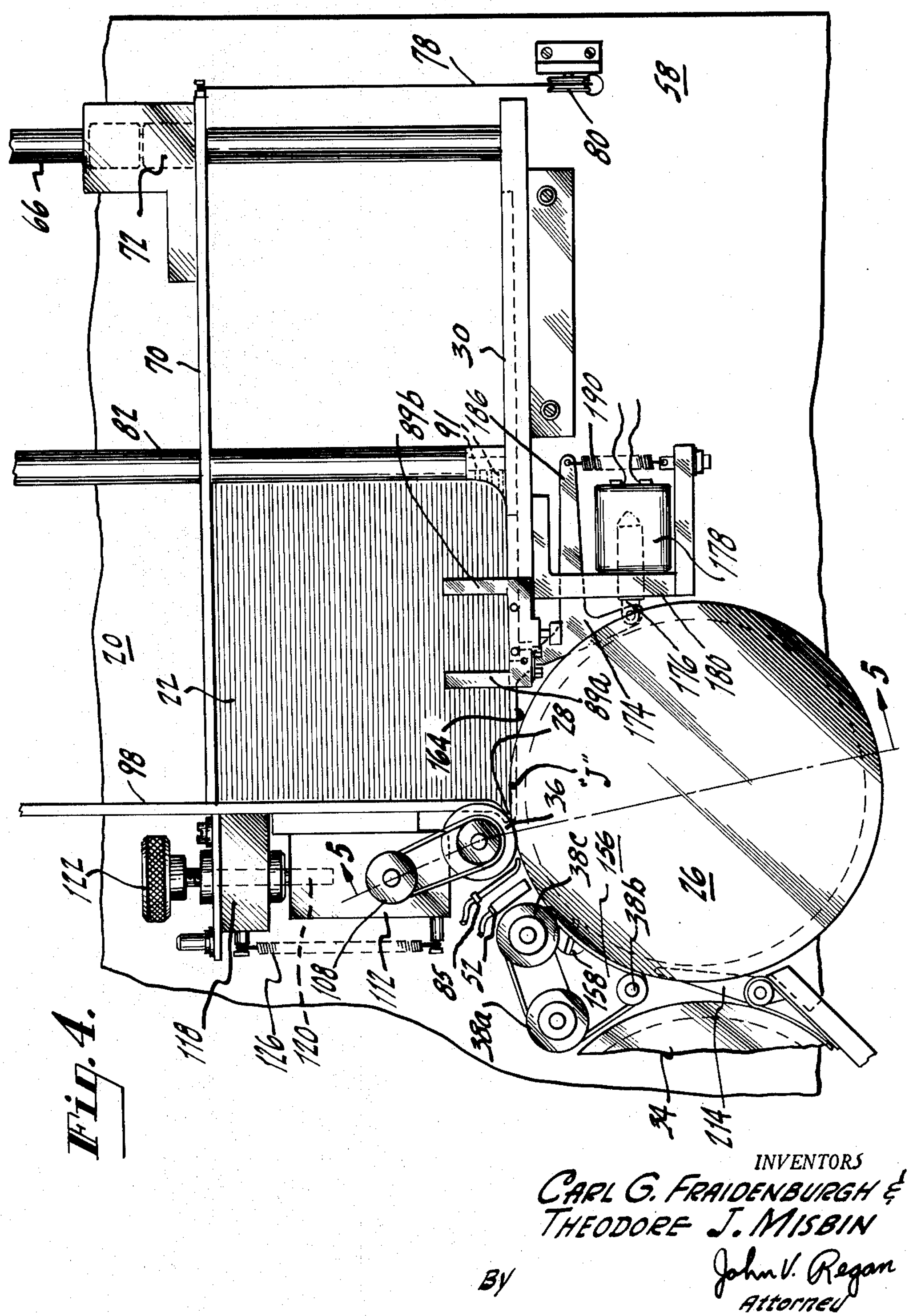
FIGURE 4 is a detailed, fragmentary plan view of the feed drum, assembly, input hopper and separator wheels.

Guide bar 82 is fan-shaped at its forward end (FIGURES 2 and 4) to guide the first few documents into the throat 28 area of the hopper 20. Preferably, the contour of the forward left side of guide bar 82 is the same as that of the side wall 98 in the area of the throat. Pressurized air is introduced into the hollow guide bar 82 by way of a hose 87, and exits through air passages 91 drilled in the left side of the fan-shaped end (FIGURE 4). This pressurized air is directed on the trailing edges of the first few documents in the stack to riffle these documents and prevent frictional drag between them. Essentially, the first few documents are separated from each other by a cushion of air. This is important for the reason that it permits a uniform pickup of the documents by the feed drum 26. Pressurized air also is introduced at the throat 28, by means of a nozzle 85 (FIGURE 2), for the same purpose.

In prior art document transport devices which use pressurized air for riffling the documents, the air always is introduced at a fixed point. This means that when documents of more than one size are used, the pressurized air has a different effect on the different size documents. In particular, either the pressure of the air applied to the documents is greater for one size document than for another, or the air is not directed to the same point on the different size documents. In the present embodiment, however, the pressurized air always is applied directly at the trailing edges of the first few documents, regardless of document length, because the guide bar 82 always is positioned against the trailing edges of the documents. Thus, the air pressure on the documents is the same regardless of the size of the document.

The task of reading the information on the documents is simplified when the line or lines of information on the various documents all are referenced to a common plane as the documents pass the reading station. This is achieved when the bottom edges of the documents in the input hopper 20 rest on the base plate 56 as they are picked up by feed drum 26. A vertical guide bar 88 is provided for this purpose. The guide bar 88 is a U-shaped member having arms **89*a*, 89*b*. (See especially FIGURE 8.) Vertical guide bar 88 is slidably mounted on a pair of vertical studs 90 which project from the top surface of forward wall 30. The free end of each of the arms 89*a*, 89*b* has an inclined surface which acts to guide the documents 22 down to the base plate 56. The guide bar 88 is adjusted vertically by the operator so that the horizontal portions of the arms 89*a*, 89*b* just clear the tops of the documents in the hopper 20. Guide bar 88 is fastened in this position by means of an adjustable screw 92. As explained previously, the first few documents 22 are separated by a cushion of air and, therefore, may be pushed down to the base plate 56 easily as they move under the vertical guide bar 88**.

FEEDER ASSEMBLY

Figure 5:
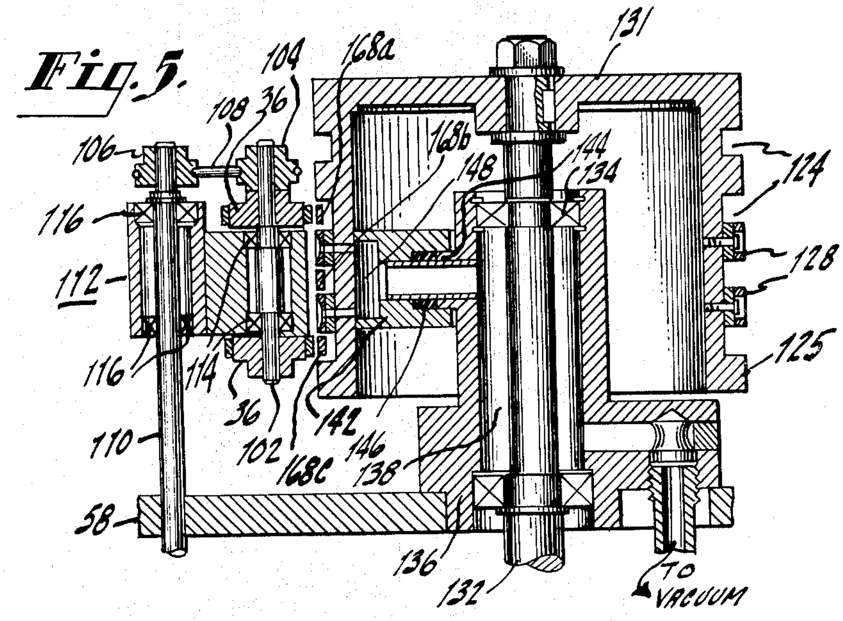
FIGURE 5 is a sectional view of the feeder drum and separator wheels taken along the lines 5—5 of FIGURE 4.

Adjacent the forward end of the left hopper wall 98, at the throat 28, is a pair of rotating separator wheels 36 mounted on a common shaft 102 (FIGURE 5). Fixed to the shaft 102, at the top thereof, is a drive wheel 104 which is driven from a second wheel 106 by means of a belt 108. The drive wheel 106 is mounted on a shaft 110 which extends through the common base plate 58. Shafts 102 and 110 are supported in a block 112 by pairs of bearings 114, 116, respectively. Block 112 is constrained in slides attached to the hopper side wall 98, and is movable toward or away from the feed drum 26 to adjust the depth of the throat 28 opening in accordance with the thickness of the documents in the hopper 20. A second block 118 is fixedly mounted on the common base plate 58 and is mechanically coupled to the separator wheel block 112 by a differential screw 120. At the back of block 118 is an adjustable knob 122 for turning the differential screw 120 to position block 112 relative to fixed block 118. Block 112 moves in the slides aforementioned toward or away from the feeder drum 26 as the adjusting knob 122 is turned. The blocks 112 and 118 also are mechanically coupled by a tension spring 126 which biases block 112 toward fixed block 118 and eliminates play in screw 120.

The separator wheels 36 rotate counterclockwise, as viewed in the drawing. The forward end of the hopper side wall 98 has a radius of curvature which is slightly greater than the radii of the separator wheels 36 so that the separator wheels normally act only on the leading edge of the first document. The frictional force exerted on the first document by the separator wheels 36 is less than the force exerted on that document by the feeder drum 26 when the document is being fed out of the hopper 20, and thus does not prevent feeding of the first document. However, in the event that two documents are attempted to be moved out of the hopper 20 at the same time, the separator wheels 36 engage the back surface of the second document. The frictional force of the separator wheels 36 on the second document is greater than any force on this document from the feed drum 26 because of the interposed first document. Accordingly, the separator wheels 36 prevent the second document from being fed out of the hopper 20 concurrently with the first document.

Figure 6:
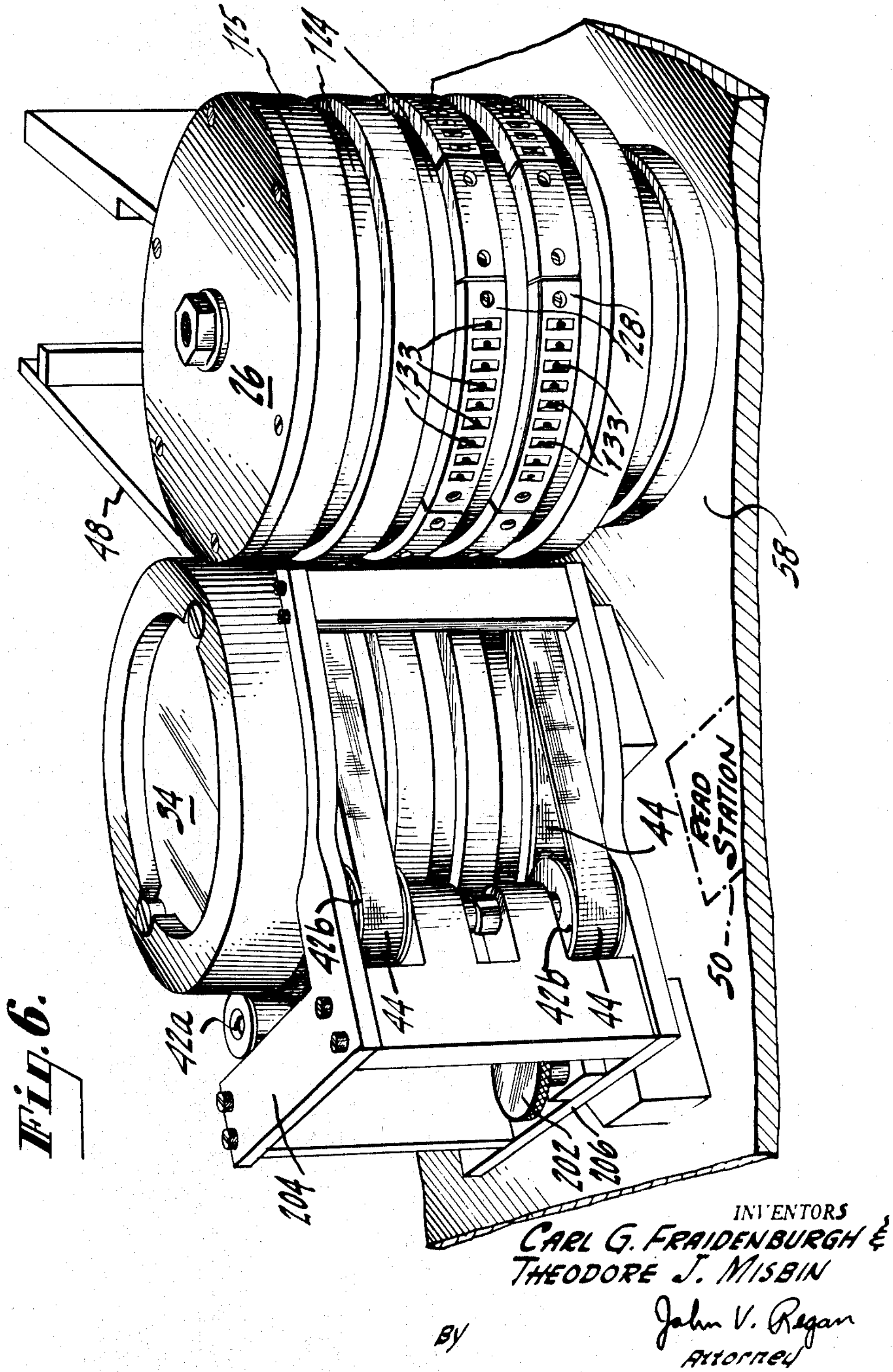
FIGURE 6 is a perspective view of the feeder drum, stacker drum and stacker drum belt assembly.

Feeder drum 26 is a self-valving pickup drum having recessed grooves 124, best shown in FIGURES 5 and 6. Separator wheels 36 are opposite first and third grooves in the drum 26. Removable shoes 128 (FIGURE 6) are clamped on the wall 131 of drum 26 by screws, and form two of the raised, circumferential bands 125 of the drum 26. Apertures or slots 130 (FIGURE 7) are drilled or cut through the drum wall 26 behind these two circumferential bands. Some of the shoes 128 have apertures therein which are spaced to mate with the apertures 130. Others of the shoes 128 are solid, that is to say, contain no apertures. These shoes 128 are removable and, as will be described more fully hereinafter, the pattern of apertured and solid shoes 128 is selected in accordance with the length of the documents 22 in the hopper to adjust the rate of card feed (cards per minute) according to document length. The apertured ones of the shoes 128 have high friction, abrasive-resistant surfaces, such as urethane rubber. Another drum shoe arrangement is illustrated in FIGURES 16 and 17 and will be described hereinafter.

The drum 26 is open at the bottom, and is keyed to a shaft 132 which extends through the common base plate 58 to drive means, which will be described. Shaft 132 is supported by bearings 134 mounted on a housing support 136 which rests on the common base plate 58. Air-tight seals are located between these bearings 134 and the housing 136. Surrounding the shaft 132 in the housing 136 is a cavity 138 which is connected to a suitable vacuum source (not shown). Cavity 138 serves as a small tank to dampen pulsations from the source.

A valve shoe 142 is constrained to slide on a boss 144 which is integral with the housing support 136. Valve shoe 142 is located against the inner surface of the drum wall 131 due to the relative difference in air pressure. A piece of nonporous rubber 146 provides an air-tight seal between the valve shoe 142 and the boss 144. This nonporous rubber 146 also serves to load the valve shoe 142 against the inner surface of the drum wall 131. The valve shoe 142 is made of a material having a low coefficient of friction, such as a filled tetrafluorethylene polymer, which provides an excellent seal to prevent air leakage between the valve shoe 142 and the rotating drum wall 131. Valve shoe 142 has a chamber 148 of such extent that the first hole in any apertured shoe 128 is opened to atmosphere approximately a quarter-inch clockwise from the hopper side wall 98. This point is designated "J" in FIGURE 4. The vacuum chamber 148 extends far enough counterclockwise, along the inner wall 131 of the drum so that the leading edge of the document being transported is transferred to the first set of transport belts 40.

A different document is fed out of the hopper 20 each time a different apertured shoe 128 passes the vacuum chamber 148. In one operative embodiment of the invention, in which the outermost circumference of the drum 26 was 18 inches, documents 22 which had a length in the range of from four to eight and one-half inches were fed out of the hopper 22 at the rate of 1,000 per minute. Documents which had a length lying in the range of from two and one-half inches to four inches were processed at the rate of 2,000 per minute. The linear speed of a document is constant and independent of document length inasmuch as the feeder drum 26 and the stacker drum 34 (to be described) rotate at a constant angular velocity. When documents of the shorter size aforementioned are transported, four sets of apertured shoes are employed, in the given example, as shown in the cross-sectional view of FIGURE 7. Two of the alternate apertured shoes, for example 128*a* and 128*c*, are removed and replaced by solid, nonapertured shoes when the longer size documents aforementioned are being transported. Thus, it may be seen that four of the shorter documents are fed out of the hopper 20 per drum revolution and two of the longer documents aforementioned are fed per drum revolution.

The first set of three pairs of idler rollers 38*a*, 38*b* and 38*c* are mounted on shafts on a plate assembly 156 which is fastened to the common base plate 58 by means of a shoulder screw 158. The plate assembly 156 may pivot on the shoulder screw 158 and is biased, or spring loaded, toward the feed drum 26 so that the belts 40 are tightly loaded against the wall 131 of the feeder drum 26. Belts 40 are frictionally driven by the feeder drum 26. Idler rollers 38*a* may be mounted on eccentric studs so that individual adjustment of each belt 40 may be made. The document being fed out of the input hopper 20 is carried to the belts 40 by the vacuum in the drum 26. Belts 40 press the document against the surface of the drum 26, whereby the document continues to be fed by the drum 26 under friction after the apertured shoes 128 have moved out of the range of the vacuum chamber 148.

INPUT CONTROL GATE

Documents 22 in the input hopper 20 may be selectively fed, or not fed, under control of the operator. This demand feed feature is accomplished by an input gate mechanism 32 illustrated in detail in FIGURE 8. The fixed, partial front wall 30 of the hopper 22 extends to the left (FIGURE 4) to the vicinity of the feeder drum 26, and terminates approximately at a point defined by the left-hand arm 89*a* of the vertical guide 88. The control gate 32 includes a bifurcated member 164 having arms, or fingers, 166*a*, 166*b* and 166*c* which are positioned opposite grooves in the drum 26. The forward wall 30 has a cutout portion for receiving a projecting tab of the bifurcated member 164. A pair of notched blocks 168*a*, 168*b* are screwed to the forward wall 30 and clamp a stiff wire 170, under tension, near its ends.

A linkage 174 is pinned at one end to the plunger 176 of a solenoid 178. The solenoid 178 is mounted on a bracket 180 which is bolted to the front wall 30. The opposite end of the arm 174 is integral with a notched block 184 which is screwed to the tab of the bifurcated member 164. The wire 170 extends into the notch in the block 184 to form a torsion hinge. A side arm 186, integral with the linkage 174, projects through an aperture 188 in the bracket 180. A tension spring 190 is connected between the end of the side arm 186 and an extension of the bracket 180.

Operation of the input control gate may be seen best in FIGURE 9. In FIGURE 9*a*, the solenoid 178 is in the de-energized condition. Tension spring 190 (FIGURE 8) forces the bifurcated member 164 to swing in the clockwise direction to the position shown in FIGURE 9*a*. The fingers 168*a*, 168*b* and 168*c* then lie outside the grooves of the drum 26 and prevent the apertured shoes of the drum from contacting the first document in the stack. No documents are fed out of the hopper 22 when the input gate is in this condition.

The bifurcated member 164 swings counterclockwise on the torsion hinge when solenoid 178 is energized. Fingers 168*a*–168*c* then lie in the grooves of the drum 26, as shown in FIGURE 9*b*. The leading edge of the first document (not shown) then is in contact with the drum 26, and the first document is fed out of the hopper 20 when an apertured shoe moves into the range of the vacuum chamber 148 of the drum.

It will be recalled that the first few documents in the hopper 20 normally are separated by a cushion of air. When the bifurcated member 164 moves from the "feed" position (FIGURE 9*b*) to the "inhibit" position (FIGURE 9*a*), the air separating the first few documents essentially is squeezed out and the first few documents are pushed together. Therefore, it is not necessary that the bifurcated member 164 overcome the entire weight of the stack of documents when it moves from the feed to the inhibit position. The position of the fingers 168*a*–168*c* relative to the drum 26, when the input gate is in the feed position, also is shown in the cross-sectional view of FIGURE 5.

STACKER ASSEMBLY

Figure 7:
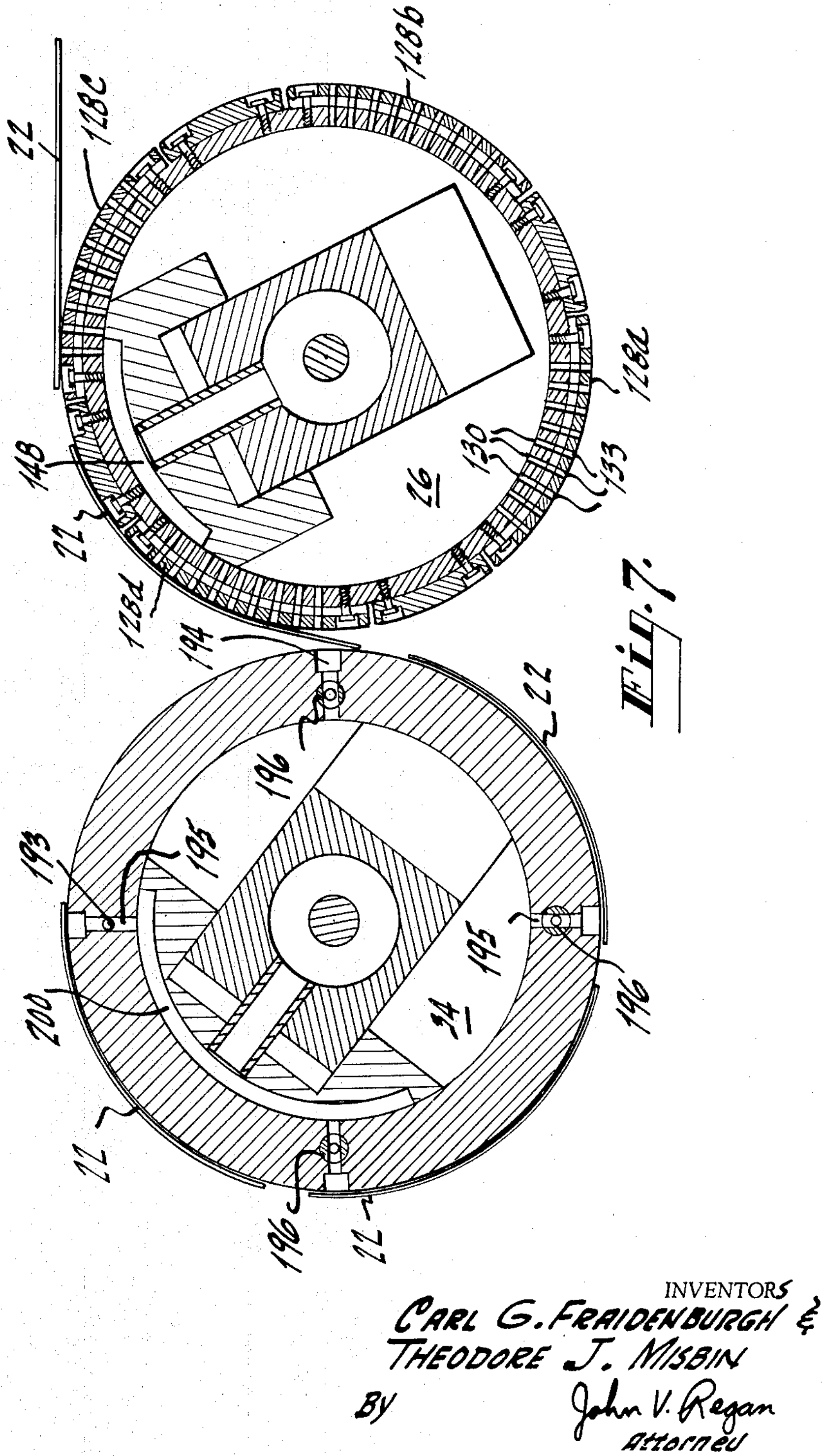
FIGURE 7 is a plan view, in cross section, of the feeder and stacker drums.

The stacker assembly is shown in detail in the plan view of FIGURE 10 and the cross-sectional view of FIGURE 11. Stacker drum 34 is a grooved vacuum drum keyed to a rotating shaft 192. The internal construction of the stacker drum 34 is substantially similar to that of the feeder drum 26, except as noted hereinafter. Stacker drum 34 has a number of sets of vertically aligned ports 194, there being four ports 194 per set in the illustrated embodiment, and a total of four sets (FIGURE 7).

It is desired that vacuum be applied to any one document from only one set of ports 194. For the example given previously, four of the short documents are transported per drum revolution, and each set of ports 194 applies a vacuum to a different one of the four documents during a drum revolution. When the longer documents are transported (two per drum revolution), means must be provided for blocking the vacuum from two of the alternate sets of ports. The latter two sets may be provided with rotary valves for this purpose.

Consider first the sets of ports which have no rotary valves. One such set is shown at the right of FIGURE 11. These ports 194 are interconnected with each other, and with an opening 195 in the drum inner wall, by means of a common channel, or passage 193. Whenever the opening 195 is opposite any portion of the vacuum chamber 200, vacuum is applied to the document through opening 195, passage 193 and ports 194.

A set of ports 194 having a rotary valve associated therewith is shown on the left of FIGURE 11. The rotary valve includes a hollow, vertical tube 196 having an opening which mates with opening 195 for one position of the tube 196. Tube 196 also has openings which mate with the upper three ports 194 in this position. Accordingly, when the opening 195 passes vacuum chamber 200, a vacuum is applied to the document through opening 195, hollow tube 196 and ports 194.

The upper end of tube 196 is affixed to a threaded sleeve 197 which is screwed into the drum wall 34. The head 198 of the sleeve 197 has a slot in the top thereof into which an instrument may be inserted for rotating the hollow tube 96. Rotating the tube 196 a quarter of a turn, or 90°, closes off the opening 195 and the upper three ports 194, whereby no vacuum is applied to the document.

The stacker belt assembly includes a second set of three pairs of idler rollers 42*a*, 42*b* and 42*c* on which flat belts 44 are guided. The pairs of idler rollers 42*a*–42*c* are mounted on shafts in housings which are supported between two plates 204, 206 (FIGURE 6). The plate assembly is pivotally mounted on a shoulder screw 208 and pivoted counterclockwise, as viewed in FIGURE 10, until the belts 44 are brought into tight contact with the stacker drum 44. The assembly is locked in this position by a locking screw 202. Belts 44 are driven by the continuously rotating stacker drum 34. Projecting from the plate assembly near the idler rollers 42c is a stripper guide 214 which rides in grooves of feeder drum 26. The stripper guide 214 strips the documents off the feed drum 26 and guides the documents into the nip between the stacker drum 34 and the belts 44.

The timing of the machine is such that when the leading edge of the document reaches point "Q" (FIGURE 10) adjacent the idler rollers 42a, one set of ports 194 is interposed between the leading edge of the document and the vacuum chamber 200. The leading edge of the document is held by vacuum to the stacker drum 34 until the leading edge of the document is at point "H" (FIGURE 10), opposite the entrance to the output stacker, at which point it is stripped from the drum 34 by the output gate, to be described.

The output stacker 24 (FIGURE 11) has a base plate 216 which is elevated above, and shock-mounted to, the common base plate 58 in the same manner as the input hopper base plate 56. The electromagnet 62 (FIGURE 1) vibrates the base plates 58 and 216 of the input hopper 20 and the output hopper 24, respectively. A loading plate 218 moves on linear bearings 219 along a guide rod 220( FIGURE 1) and is urged toward the front of the output hopper 24 by means of a weight (not shown) beneath the common base plate 58, in the same manner as the loader plate 70 in the input hopper 20. A belt 222, driven by a motor 224 (FIGURE 1), carries the trailing edges of the documents into the output hopper 24 after the trailing edge clears the idler rollers 42a.

As described previously, it is desired that means be provided for distinguishing those documents which are rejected as unreadable, etc., from the other documents in the output hopper 24. This is accomplished by an output gate member, to be described, which, in one position, guides the documents against the right-hand wall 48 of the output hopper 24 and, in the other position, offsets the "rejected" documents from the stack, as illustrated in FIG. 10.

OUTPUT GATE MECHANISM

The output gate is illustrated in detail in FIGURE 12, and its operation is illustrated in FIGURES 13*a* and 13*b*. The gate comprises a bifurcated member 228 having one or more fingers 230a–230c. The fingers 230a–230c are adapted to ride in the grooves of the stacker drum 34, and are step-shaped at the free ends. The bifurcated member 228 is torsion hinged on a wire 234 in the same manner as the input gate mechanism (FIGURE 8) described previously. Bifurcated member 228 is connected at the hinge to a linkage 236. The plunger 238 of a solenoid 240 is pinned to the drag link 235 which in turn is pinned to linkage 236. The end of the linkage 236 is connected by a compression spring 242 to the solenoid mounting bracket 246.

FIGURE 13*a* illustrates the position of the fingers 230a–230c in the "accept" position of the gate with the solenoid 240 energized. Plunger 238 is pulled into the solenoid 240 and causes the bifurcated member 228 to pivot in a counterclockwise direction, moving the fingers 230a–230c into the grooves of the stacker drum 34. The entire step-shaped ends of the fingers 230a–230c lie within the grooves. These fingers 230a–230c strip the document from the stacker drum 34, and the document is guided along the fingers 230a–230c to the righthand wall 48 of the output hopper 24. Compression spring 242 causes the bifurcated member 228 to pivot clockwise about hinge 234 when solenoid 240 is de-energized ("reject" position). In this position of the member 228, the shoulder portions of the fingers 230a–230c are moved out of the grooves and into the path of travel of the document. The document abuts against the shoulders 250 (FIGURE 13b), whereby the documents are prevented from moving to the right-hand wall 48 of the output hopper. Accordingly, the rejected documents are offset from the stack.

MECHANICAL DRIVE AND TIMING SYSTEM

FIGURE 14 is a view, partly in block form, of the mechanical drive portion of the transport system which is located below the common base plate 58. As described previously, the shafts 110, 132 and 192 of the drive roller 106, feeder drum 26 and stacker drum 34, respectively, extend downward through cutouts in the common base plate 58. The shaft 132 of the feeder drum 26 is driven by a gear arrangement 260 from a synchronous motor 262. Shaft 192 is mechanically coupled to shaft 132 by means of a 1:1 gear ratio mechanism 264, whereby the feeder drum 26 and the stacker drum 34 operate in synchronism at the same angular velocity. Shaft 110 of the drive wheel 106 may be driven, for example, by a belt (not shown) from the synchronous motor 262.

A timing disk 268 is mounted on, and rotates with, the shaft 132. Disk 268 may have three tracks of timing pulses and a separate pickup transducer 270, 272, 274 (FIGURE 15) positioned to sense the timing marks in the separate tracks. The timing signals are used to synchronize the starting and stopping of document feed from the input hopper 20 and the operation of the input gate solenoid 178 and the output gate solenoid 240.

The basic electrical control system for the transport is shown in FIGURE 15. "Start feed" signals picked up the transducer 270 are amplified by an amplifier 280 and applied to one input of a first AND gate 282. A second input to this AND gate 282 is a "reader status" level from the document reader, which level is of the proper amplitude and polarity to energize one input of the AND gate 282 when the reader is energized and in condition to perform a reading operation. A third input to the AND gate 282 is applied from a switch 284, which is turned to the "on" position when it is desired to feed documents out of the input hopper 20. The output of the AND gate 282 is applied to the set (S) input terminal of a flip-flop 288. Solenoid 178 of the input gate is connected to the (1) output terminal of the flip-flop 288 and is energized when the flip-flop 288 is in the sets (S) state.

The transducer 272 supplies "stop feed" signals to an amplifier 290, the output of which is applied to one input of a second AND gate 292. The second input to this gate 292 is supplied from a switch 294 which is turned to the "on" position when it is desired to stop feeding documents. The output of gate 292 is applied to the reset (R) input terminal of the flip-flop 288. Signals picked up by the third transducer 274 are amplified in an amplifier 300 and applied to one input of a third AND gate 302 and a fourth AND gate 304. "Document accept" and "document reject" signals from the reader are applied as second inputs to gates 302 and 304, respectively. The outputs of gates 302 and 304 are applied to the set (S) and reset (R) input terminals, respectively, of a flip-flop 306. Solenoid 240 of the output gate is connected to the (1) output terminal of flip-flop 306.

Initially, flip-flops 288 and 306 are both in the reset state and solenoids 178 and 240 are de-energized. Fingers 166a–166c of the bifurcated input gate member 164 (FIGURE 8) hold the first document in the input hopper 20 away from the feeder drum 26 when solenoid 178 is de-energized. No documents are fed out of the input hopper 20 in this condition. The bifurcated output member 228 is in the document reject or offset condition when its solenoid 240 is de-energized. Both of the switches 284 and 294 are in the "off" position.

The transport is conditioned to feed documents when the "start feed" switch 284 is moved to the "on" position. Assuming that the reader is energized, the next-occurring signal timing mark sensed by the transducer 270 enables the first AND gates 282, and the output of this gate 282 sets the flip-flop 288 to energize the input gate solenoid 178. The timing marks in the outer-most track of disk 268 pass the transducer 270 at a point in the operating cycle of the feeder drum 26 which permits the solenoid 178 sufficient time to pivot the fingers 166a–166c (FIGURE 8) into the grooves of the feed drum 26 before the next apertured drum shoe 128 approaches the leading edge of the first document in input hopper 20.

The document reader makes a decision whether to "accept" or "reject" the document before the leading edge of the document approaches the output gate. The timing marks on the inner-most track of the disk 268 are spaced to pass the transducer 274 for that track in sufficient time to allow the output gate solenoid 240 to pivot the bifurcated gate member 228 (FIGURE 12) before the document reaches the gate. Third AND gate 302 is enabled by the concurrence of a "document accept" signal from the reader and a timing mark sensed by the transducer 274. Flip-flop 306 then is set and the solenoid 240 is energized. Bifurcated gate member 228 pivots on the torsion hinge (FIGURE 12) and moves the fingers 230a–230c into the grooves of the stacker drum 34 (FIGURE 13*a*). Solenoid 240 remains energized until the first "document reject" signal is received from the reader.

Documents fed to the output hopper 24 during this period are stacked against the right-hand hopper wall 48. Upon the concurrence of a "document reject" signal from the reader and a timing signal from the transducer 274, fourth AND gate 304 is energized to reset the flip-flop 306. Solenoid 240 then becomes de-energized, and compression spring 242 pivots the bifurcated member 228 clockwise so that the fingers 230a–230c move into the position shown in FIGURE 13*b*. Shoulders 250 of these fingers 230a–230c then block the path of the document and cause the document to be offset from the stack in the output hopper 24.

The feeding of documents is stopped by moving the "stop feed" switch 294 to the "on" position, thereby energizing one input to the second AND gate 292. Feeding of documents, however, does not stop in the middle of a feeding cycle. That is to say, feeding does not stop while a document is in the process of being fed out of the input hopper 20. The timing marks on the middle track of disk 268 are spaced to pass the transducer 272 during the period between the feeding of documents. The next-occurring mark sensed by the transducer 272 enables the second AND gate 292 at the end of a feed cycle and resets the flip-flop 288. Solenoid 178 then becomes de-energized and the fingers 166a–166c of the input gate move out of the grooves 26 to move the first document in the input hopper 20 away from the feeder drum 26.

DRUM SHOES

The apertured shoes 128 (FIGURE 6) are removable individually and replaceable by solid shoes which have no apertures. By selecting the proper pattern of apertured and solid shoes, documents of different length may be transported at the same linear speed, but at a rate dependent upon document length. Another drum shoe arrangement, for accomplishing the same purpose, is illustrated in the cross-sectional views of FIGURES 16 and 17.

Documents are picked up and fed out of the input hopper 20 (FIGURE 4) by the apertured shoes 320, one of which is shown in FIGURE 16, whenever the apertures 322 in the shoes 320 are aligned with apertures in the drum wall 131. The shoes 320 are clamped to the drum wall 131 by means of screws 324. Elongated slots 326 are cut in the shoes 320 for receiving the screws 324. The vertical dimension of a slot 326 is greater than the diameter of a screw 324, but less than the diameter of the head screw. However, the horizontal dimension of a slot 326, measured in a direction along the circumference of the drum wall 131, is much greater than the diameter of the screw 324. Accordingly, a shoe 320 may be moved a small amount circumferentially when the screws 324 are loosened. Adjacent shoes are spaced from each other by an amount sufficient to allow such movement of the shoes.

FIGURE 16 illustrates the position of a shoe 320 when the apertures 322 in the shoe 320 are aligned with apertures in the drum wall 131. In this position of the shoe 320, a document is picked up at the input hopper 20 by vacuum applied through the apertures 130, 322. The shoe 320 is clamped in this position by tightening the screws 324.

In the event it is desired that no document be picked up by a particular shoe 320, the screws 324 for that shoe are loosened and the shoe 320 is moved a slight amount, relative to the drum, to the position illustrated in FIGURE 17. The screws then are tightened to clamp the shoe 320 in this position. Apertures 322 do not mate with the drum apertures 130 and, accordingly, no vacuum is applied to a document through the apertures 322 when the shoe 320 is in this position. This arrangement has the advantage that no replacement shoes are necessary, and the possibility of misplacing an unused shoe is eliminated.

What is claimed is:

1. In combination a document transport vacuum drum, a plurality of apertures in the wall of said drum spaced along a circumferential path; a number of drum shoes slidably mounted on said drum along said path and each shoe having apertures therein which are spaced to mate with apertures in said drum for one position of that shoe; and means for individually clamping each of said shoes to said drum in a desired position, whereby each shoe may be positioned with its apertures mating with ones of the drum apertures or with the shoe blocking those drum apertures, as desired.

2. In combination a document transport vacuum drum, a plurality of apertures in the wall of said drum spaced along a circumferential path; a number of drum shoes which are slidably mounted individually on said drum along said path, each shoe having apertures therein which are spaced to mate with ones of the apertures in said drum for a first position of that shoe, each shoe blocking the associated ones of said drum apertures for a second position of that shoe; and means for individually clamping said shoes selectively in said first position or said second position.

3. The combination comprising: a document transport vacuum drum having a circumferential groove; a plurality of apertures in the wall of said drum spaced along said groove; a number of drum shoes slidably mounted on said drum in said groove, each shoe having apertures therein which mate with ones of the drum apertures in a first position of that shoe, each shoe blocking the associated drum apertures in a second position; and means for individually clamping each said shoe to said drum in a desired one of the first and second positions.

4. In combination: an input hopper for storing a stack of documents to be transported; a vacuum feeder drum adjacent the first document in said hopper; a plurality of apertures in the wall of said drum spaced along a circumferential path for applying vacuum to feed said documents out of said hopper, the number of documents fed out of said hopper per drum revolution being a function of the number of drum apertures through which vacuum is applied to said documents; a number of drum shoes which are slidably mounted individually on said drum along said path, each shoe having apertures therein which are spaced to mate with ones of the apertures in said drum for a first position of that shoe, each shoe blocking the associated ones of said drum apertures for a second position of that shoe; and means for individually clamping said shoes selectively in one of the first and second positions.

5. In combination: an input hopper for storing a stack of documents to be transported; a vacuum feeder drum adjacent the first document in said hopper and having a circumferential groove; a plurality of apertures in the wall of said drum spaced along said groove for applying vacuum to feed said documents out of said hopper, the number of documents fed out of said hopper per drum revolution being a function of the number of drum apertures through which vacuum is applied to said documents; a number of drum shoes which are slidably mounted individually on said drum in said groove, each shoe having apertures therein which are spaced to mate with ones of the apertures in said drum for a first position of that shoe, each shoe blocking the associated ones of said drum apertures for a second position of that shoe; and means for individually clamping said shoes selectively in one of said first and second positions.

References Cited by the Examiner

UNITED STATES PATENTS

| | | | |
|---|---|---|---|
| 557,056 | 3/1896 | Dejonge | 271—74 X |
| 604,892 | 5/1898 | Blaisdell. | |
| 1,639,221 | 8/1927 | Fairchild et al. | 271—28 |
| 2,033,849 | 3/1936 | Mudd | 271—29 |
| 2,057,279 | 10/1936 | Shomaker | 271—28 |
| 2,822,171 | 2/1958 | Luning | 271—71 |
| 2,982,546 | 5/1961 | Endo | 271—71 |
| 3,076,649 | 2/1963 | Stevenson | 271—71 |

M. HENSON WOOD, Jr., *Primary Examiner.*

ROBERT E. PULFREY, ROBERT B. REEVES, *Examiners.*